United States Patent [19]
Cody

[11] Patent Number: 6,021,995
[45] Date of Patent: Feb. 8, 2000

[54] ADJUSTABLE MOLD FOR A MOLDED FOOD PROCESSING SYSTEM

[75] Inventor: Daniel J. Cody, Prairie du Sac, Wis.

[73] Assignee: DEC International, Inc., Madison, Wis.

[21] Appl. No.: 08/866,872

[22] Filed: May 30, 1997

[51] Int. Cl.[7] .................................................. B29C 39/26
[52] U.S. Cl. ......................... 249/155; 249/158; 249/161
[58] Field of Search ................................... 249/155, 156, 249/158, 161; 425/441

[56] References Cited

U.S. PATENT DOCUMENTS

| | | | |
|---|---|---|---|
| 955,282 | 4/1910 | Pocock | 249/155 |
| 1,444,179 | 2/1923 | Fiala | 249/155 |
| 3,616,845 | 11/1971 | Farmer | 249/155 |
| 3,881,856 | 5/1975 | Fougea | 249/158 |
| 3,931,951 | 1/1976 | Fougea | 249/158 |
| 3,999,736 | 12/1976 | Theodorsen | 249/158 |
| 4,402,484 | 9/1983 | Kataishi et al. | 249/158 |
| 4,802,649 | 2/1989 | Salazar | 249/161 |
| 5,277,396 | 1/1994 | Vappula | 249/158 |
| 5,520,097 | 5/1996 | Cody et al. | 99/353 |

*Primary Examiner*—Robert Davis
*Assistant Examiner*—Thukhanh T. Nguyen
*Attorney, Agent, or Firm*—Andrus, Sceales, Starke & Sawall

[57] ABSTRACT

A food product mold includes a movable wall within the cavity of the mold for altering the shape or volume of the cavity. An operating mechanism interconnected with the movable wall moves the wall to various positions within the cavity. The operating mechanism includes at least one shaft rotatably mounted to and extending through the mold, a cam member mounted to the shaft and engageable with the wall, and a shaft rotating mechanism for selectively imparting rotation to the shaft to selectively engage the cam member with the wall for moving the wall within the cavity to vary the volume of the cavity. Various mold inserts may also be added to the mold cavity for varying the size and shape of the processed food products.

10 Claims, 4 Drawing Sheets

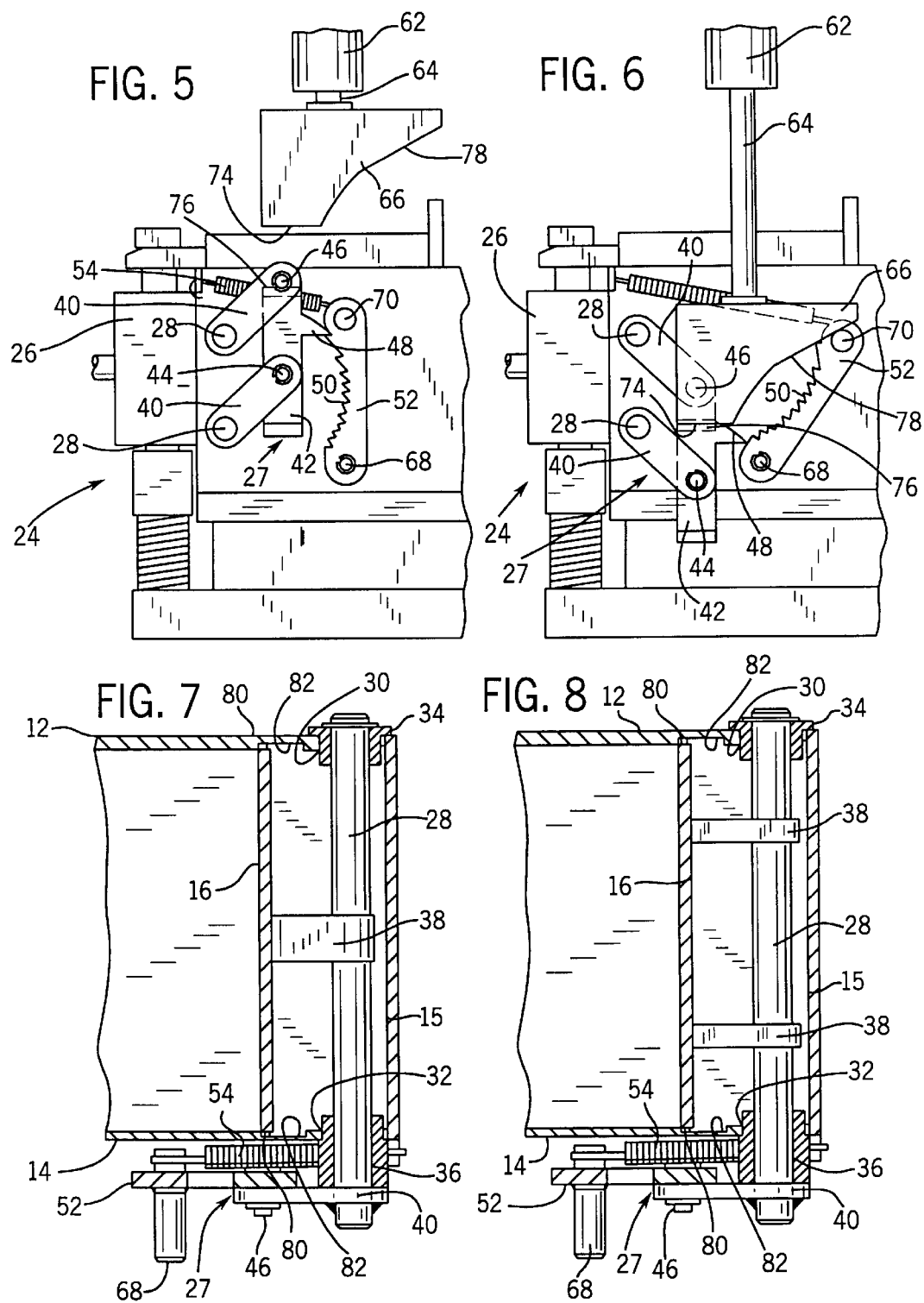

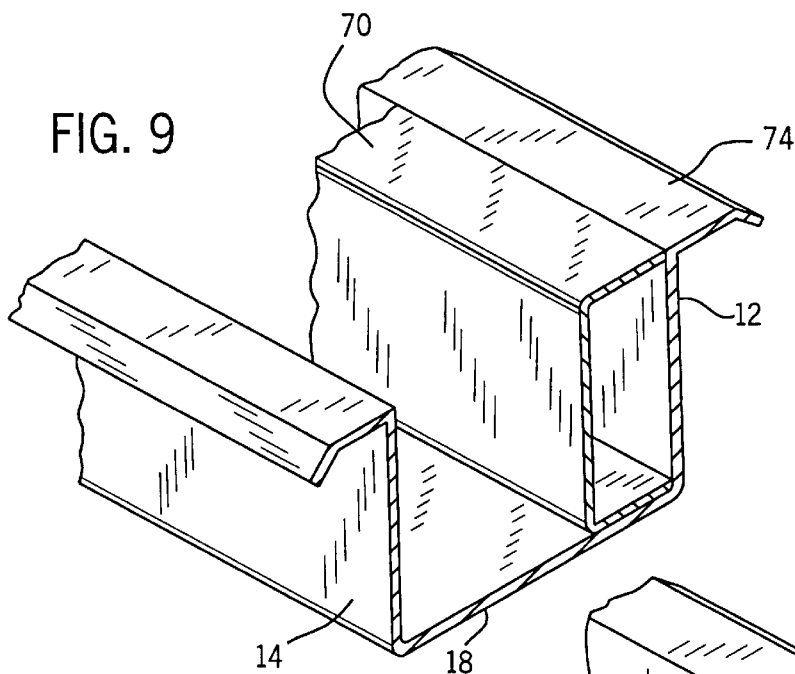
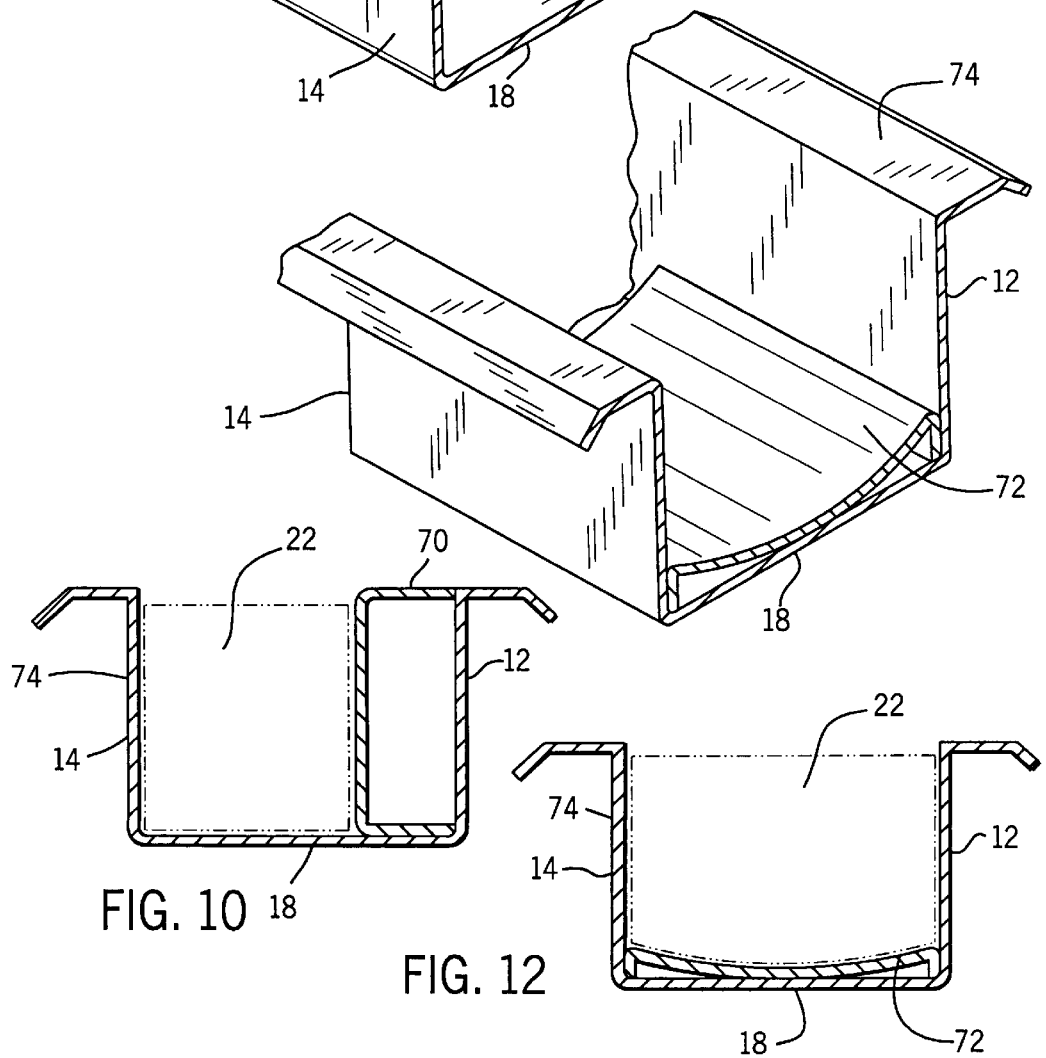

ADJUSTABLE MOLD FOR A MOLDED FOOD PROCESSING SYSTEM

BACKGROUND OF THE INVENTION

The invention relates to food processing systems having a conveyor for transporting a food product in a mold through a processing chamber to cook or chill the food product. More specifically, the invention relates to an adjustable food product mold for use in such a food processing system to vary the shape and/or size of the mold and to compensate for variances in the food product inserted into the mold.

The present invention is an improvement of my earlier U.S. Pat. No. 5,520,097, issued to the inventor of the present patent application on May 28, 1996 entitled "Molded Food Processing System", which is incorporated herein by reference.

The invention arose during continuing development efforts relating to continuous serpentine conveyor molded food processing systems. A serpentine food processor typically employs a continuous serpentine chain conveyor for transporting a food product through a processing chamber. The chamber has a predetermined temperature and environment for processing the food product, such as for cooking or chilling the product.

The present invention particularly arose during development efforts directed toward a molded meat cooker. The meat product, such as ham, is in a bag which is loaded into a shaping mold, e.g. 4 inches by 6 inches by 60 inches to form a loaf which is later sliced. A plurality of molds are carried by a conveyor through a processing chamber from a loading station to an unloading station and then returned by the conveyor from the unloading station to the loading station. The molds remain with the conveyor in the processing chamber. The bagged meat product is loaded into a mold at the loading station by an operator, and is removed or ejected from the mold at the unloading station. During cooking, the bagged meat product takes the shape of the mold. Through continuing development efforts, it has been determined that it is desirable to have a mold design that accommodates multiple sizes of meat products in a single mold. In other words, it is desirable to have a mold in which the size and/or shape of the cavity can be varied to produce food products of various shapes and sizes.

SUMMARY OF THE INVENTION

An object of the invention is to provide a device or mechanism for varying the shape and/or volume of a food product mold within a food processing system.

Another object of the invention is to provide a device or mechanism to compensate for variances in the food product inserted into the mold.

Another object of the invention is to provide a device or mechanism for varying the shape and/or volume of a food product mold that is of simple construction and easy to implement.

A further object of the invention is to provide a device or mechanism to vary the shape and/or volume of a food product mold that is relatively inexpensive to manufacture and provides reliable performance.

The present invention provides a food product mold having a cavity and a movable wall within the cavity which functions to alter the shape or volume of the cavity. The mold cavity is defined as the open area between two side members, an end wall, the movable wall, a bottom wall and a lid.

In one aspect of the invention, a food product mold has a movable wall extending between a pair of spaced side members within a mold cavity. An operating mechanism is interconnected with the pair of spaced side members and is operable to move the wall between a first position and a second position for varying the volume of the cavity.

The operating mechanism includes at least one shaft rotatably mounted to the pair of spaced side members and extending therebetween. A cam member is mounted to the shaft and is engageable with the movable wall. A shaft rotating mechanism is interconnected with the shaft and functions to selectively impart rotation to the shaft to selectively engage the cam member with the wall for moving the wall from its first position defining a first volume to its second position defining a second volume that is less than the first volume.

The shaft rotating mechanism includes a link fixed to one end of the shaft. A latch member is pivotally connected to the link at a location opposite from the fixed interconnection of the link to the shaft. The latch member includes a tooth that is engageable with a series of recesses associated with a catch member, for selectively retaining the latch member in one of a plurality of positions to retain the cam member in a desired position relative to the movable wall.

An actuator is engageable with the latch member to move the latch member to a desired position relative to the catch member. The movement of the latch member results in rotation of the shaft through the link to engage the cam member with the movable wall. Upon engagement of the actuator with the latch member, the movable wall is moved from a first position to a second position. To release the movable wall from the second position to a first position, a second actuator is used at an unloading station for releasing the catch member from the latch member, resulting in rotation of the shaft to disengage the cam member from the wall, so that the wall is moved back to its first position.

In another aspect of the invention, various types of mold inserts may be added to the mold cavity for varying the size and shape of the processed food products. These mold inserts are installed along the bottom wall or side walls of a mold pan to alter the length or cross-sectional dimension of the mold cavity resulting in different sized and shaped processed food products. For example, a rectangular insert added along a side wall of the mold pan will produce a square shaped cross-sectional food product. Also, a curved insert added along the bottom wall of the mold pan will produce a D-shaped cross-sectional food product. A length insert may be added to the mold pan to divide the mold into different sections.

Various other features and advantages of the invention will be made apparent from the following drawings and detailed description.

BRIEF DESCRIPTION OF THE DRAWINGS

The drawings illustrate the best mode presently contemplated for carrying out the invention.

In the drawings:

FIG. 5 is a side view of a portion of the food product mold of FIG. 1 showing the mold inverted and illustrating an alternate actuator for engaging the operating mechanism to facilitate discharge of the food product from the mold cavity.

FIG. 6 is a side view of a portion of the food product mold of FIG. 5 showing the alternate actuator engaging the operating mechanism.

FIG. 7 is a section view taken along line 7—7 of FIG. 3.

FIG. 8 is a section view similar to FIG. 7 showing an alternate construction utilizing two actuating cams.

FIG. 9 is a partial isometric view of a mold pan with a mold insert.

FIG. 10 is a sectional view of the mold pan and mold insert of FIG. 9.

FIG. 11 is a partial isometric view of a mold pan with an alternate mold insert.

FIG. 12 is a sectional view of the mold pan and mold insert of FIG. 11.

DETAILED DESCRIPTION OF THE INVENTION

Figures 1, 2:
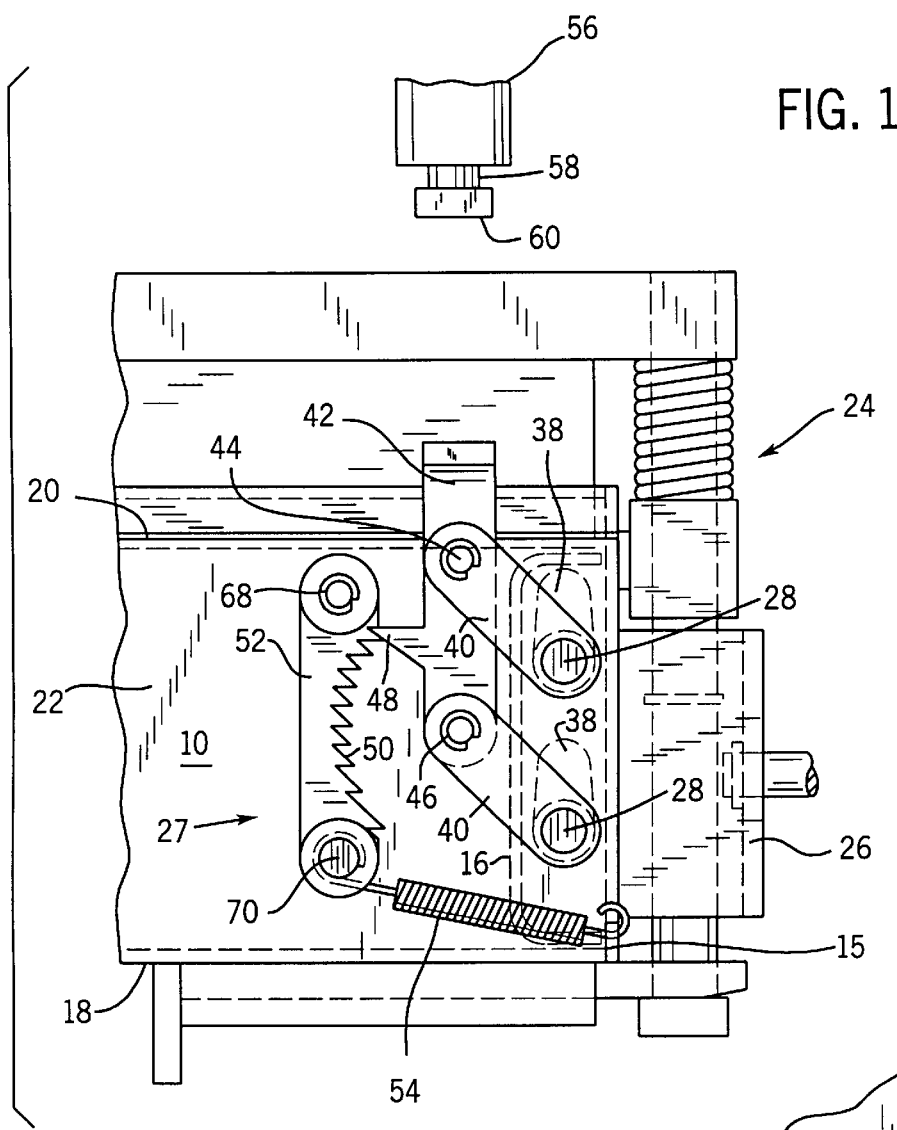
FIG. 1 is a side view of a portion of a food product mold in accordance with the invention.
FIG. 2 is a partial section view of a movable wall within the food product mold of FIG. 1 showing the movable wall in a first position maximizing the volume of the mold cavity.

FIG. 1 shows a food product mold 10 of a molded food processing system in accordance with the invention. The food product mold 10 includes two side members or walls 12 and 14, best shown in FIGS. 7 and 8, two end walls 15 (only one shown), a movable wall 16, best shown in FIGS. 2, 4, 7 and 8, a bottom wall 18, and a lid 20. A mold cavity 22 is defined as the open area between the two side members 12, 14, the end wall, the movable wall 16, the bottom wall 18, and the lid 20. The movable wall 16 is slidably fastened to the mold structure via a pin 80 and recess arrangement 82, as shown in FIGS. 7 and 8.

A latching mechanism 24 is connected to the lid 20 for opening and closing of the lid at loading and unloading stations within the molded food processing system. The mold 10 is mounted to a continuous serpentine conveyor in the molded food processing system by a bracketing arrangement 26. These details of mold 10 are illustrated and described in my U.S Pat. No. 5,520,097, and form no part of the present invention.

The movable wall 16 functions to alter the volume of the cavity 22 to compensate for variances in the food product inserted into mold 10. The movable wall 16 is movable by an operating mechanism 27 between a first position shown in FIG. 2 and a second position shown in FIG. 4. The movable wall 16 extends between the pair of spaced side members 12 and 14 and between the bottom wall 18 and the lid 20. The wall 16 is movable relative to the above mentioned structure toward and away from the end wall 15 of mold 10.

Referring now to FIGS. 7 and 8, the operating mechanism 27 is interconnected with the pair of spaced side members 12 and 14. The operating mechanism 27 consists of a pair of shafts 28 rotatably mounted to the pair of spaced side members 12 and 14. The shafts 28 extend between the two side members 12 and 14. Mounted within apertures 30 and 32 are collar bearings 34 and 36 which accommodate rotational movement of the shaft 28.

A cam member 38 (FIG. 7) is mounted to the shaft 28 and is engageable with the movable wall 16. As shown in FIG. 8, a pair of cam members 38 may be fixedly attached to the shaft 28 for engaging the movable wall 16.

Operating mechanism 27 includes a shaft rotating mechanism interconnected with the shafts 28 for controlling the position of the cam member 38 relative to the movable wall 16 for selectively moving the movable wall 16 from a first position to a second position and intermediate positions between the first and second positions. The shaft rotating mechanism is used for selectively imparting rotation to the shaft 28, thereby selectively engaging the cam member 38 with the movable wall 16 for moving the wall 16 from its first position defining a first volume, to a second position defining a second volume less than the first volume. The shaft rotating mechanism includes a pair of link members 40 rigidly fixed at one end to the end of each shaft 28. The other side of each link member 40 is pivotally connected to a latch member 42 at pivot pins 44 and 46. The latch member 42 includes a tooth 48 extending from one side. The tooth 48 engages a plurality of recesses 50 which are formed in one side of a catch member 52. The latch member tooth 48 and the catch member recesses 50 are configured to enable movement of the latch member 42 in only one direction relative to the catch member 52 against the force of a biasing spring 54. The recesses 50 form a plurality of positions in which the tooth 48 may be inserted. The biasing spring 54 retains the latch member in one of the plurality of positions. The recesses 50 on the catch member provide the intermediate positions to which the movable wall 16 can be positioned.

Figure 3:
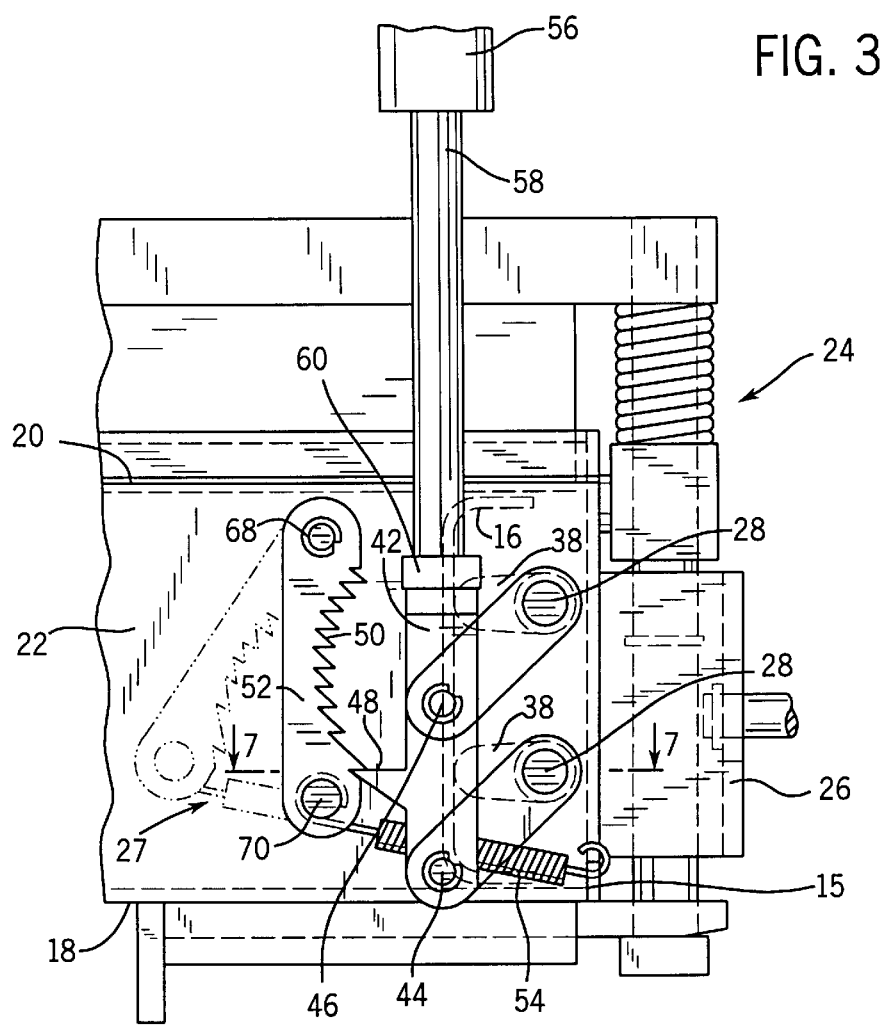
FIG. 3 is a side view of a portion of the food product mold as shown in FIG. 1, showing an actuator engaging an operating mechanism to move the wall.
Figure 4:
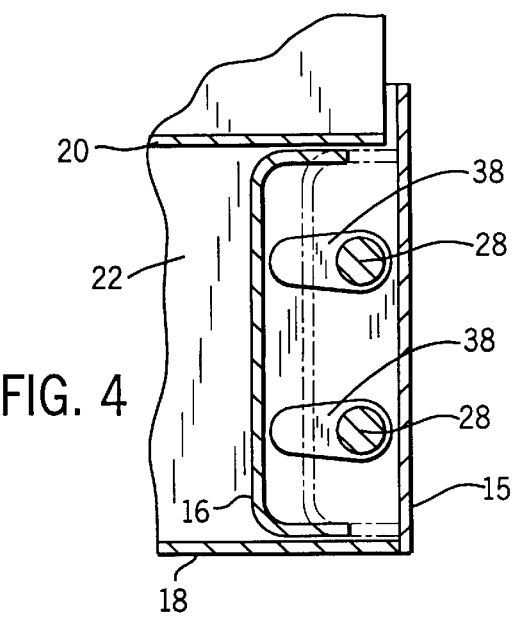
FIG. 4 is a partial section view similar to FIG. 2 showing the movable wall moved inwardly to reduce the volume of the mold cavity.

Referring now to FIGS. 1–4, a loading actuator 56 consists of a loading actuator shaft 58 and a loading actuator plunger 60. The loading actuator 56 is mounted to the framework of the food processing system at the loading station 28 shown in FIG. 1 of my previous U.S. Pat. No. 5,520,097. The loading actuator plunger 60 engages the top of the latch member 42 to move the latch member to a desired position relative to the catch member 52, thereby causing movement of the latch member and resulting in rotation of the shafts 28 through the link members 40 to engage the cam member 38 with the movable wall 16, which functions to move movable wall 16 inwardly to compress the meat or other food product loaded into mold 10. The catch member 52 is biased into engagement with the latch member 42 by biasing spring 54 to maintain latch member 42 and shafts 28 in the desired position. The pivotal mounting of the link members 40 to the latch member 42 is positioned to control the movement of the latch member 42. FIG. 2 illustrates the cam members 38 in a normal relaxed position before the loading actuator 56 engages the latch member 42 through the loading actuator plunger 60. In this position, the movable wall 16 is in its first position in which the volume of the mold cavity is maximized. FIG. 4 illustrates the cam members 38 fully extended for moving the movable wall 16 to its second position to reduce the volume of the mold cavity 22, resulting from the loading actuator fully engaging the latch member 42 through the loading actuator plunger 60 as shown in FIG. 3.

The loading actuator plunger 60 engages the top of latch member 42, pushing it downwardly to a desired position. The latch member tooth 48 extending from the catch member 42, pushes downwardly against the recesses 50 of catch member 52. The catch member 52 pivots a pivot pin 68 extending from side wall 22, as shown in FIG. 3. The biasing spring 54 is attached to a pin 70 mounted to the catch member 52 opposite pivot pin 68.

After the food product mold 10 has passed through the processing chamber, it comes to an unloading station where mold 10 is inverted and the food product is unloaded from the mold. At the unloading station, an unloading actuator 62 engages the latch member 42 to release the movable wall 16 from the food product. The unloading actuator includes an unloading actuator shaft 64 and an unloading actuator plunger 66, as shown in FIGS. 5 and 6. A straight portion 74 at the bottom edge of unloading actuator plunger 66 engages a bottom portion 76 of latch member 42. A curved portion 78 of unloading actuator plunger 66 simultaneously engages the bottom of catch member 52 causing the catch member 52 to be released from the latch member 42, as shown in FIG. 6. The unloading actuator 62 is mounted to the framework of the processing system at the unloading station 30 shown in FIG. 1 of my previous U.S. Pat. No. 5,520,097. To release the movable wall from the food product, the unloading actuator 62 extends its unloading actuator plunger 66 downwardly, engaging both the latch member 42 and catch member 52 on the side in which the biasing spring 54 is attached. The action of the unloading actuator plunger causes the tooth 48 of the latch member 42 to become disengaged from the recesses 50 of the catch member 52. The downward movement of the latch member 42 pivotally rotates the link member 40 at pivot points 46 and 48 to rotate the shafts 48, thus releasing the cam member 38 from the movable wall 16. The movable wall 16 is pushed outwardly towards the mold end wall 15 by the food product pushing laterally against it. The loading actuator 56 and the unloading actuator 62 are preferably operated by a pneumatic or hydraulic cylinder.

The same process as described above is then repeated for another food product loaded into the mold cavity 22 at the loading station.

FIGS. 9–12 illustrate another object of the invention by adding mold inserts 70, 72 into a mold pan 74 of a molded food processing system. FIGS. 9 and 11 show a mold pan 74 fitted with two different types of mold inserts 70 and 72. In FIGS. 9 and 10, a rectangular or C-shaped insert 70 is added along side member 12 of mold pan 74 to reduce the cross-sectional area of the mold cavity 22, resulting in a square shaped cross-sectional food product. FIGS. 11 and 12 illustrate a curved insert 72 that is fitted into the bottom wall 18 of mold pan 74 and bordering the two side members 12 and 14. This curved shaped insert 72 results in a D-shaped cross-sectional food product. Other types of mold inserts, such as length inserts or other cross-sectional inserts may be used for altering food product size, length and shape without departing from the spirit of the invention.

While the invention has been described with reference to preferred embodiments, those skilled in the art will appreciate that certain substitutions, alteration and omissions may be made without departing from the spirit of the invention. Accordingly, the foregoing description is meant to be exemplary only and should not be deemed limitive on the scope of the invention set forth in the following claims.

I claim:

1. In a food product mold including a cavity, the improvement comprising a member receivable within the cavity and having a configuration which functions to alter the shape or volume of the cavity, wherein the member comprises a wall which at least in part defines the cavity, and wherein the improvement further comprises an operating mechanism for moving the wall between a first position and a second position for varying the volume of the cavity, wherein the wall extends between a pair of spaced side members and is movable relative thereto between its first and second positions, and wherein the operating mechanism is interconnected with the pair of spaced side members, wherein the operating mechanism includes at least one shaft rotatably mounted to the pair of spaced side members and extending therebetween, a cam member mounted to the shaft and engageable with the wall, and a shaft rotating mechanism for selectively imparting rotation to the shaft to selectively engage the cam member with the wall for moving the wall from its first position in which the cavity defines a first volume and its second position in which the cavity defines a second volume less than the first volume, wherein the shaft rotating mechanism comprises a link fixed to the shaft, a latch member to which the link is pivotably mounted at a location spaced from the interconnection of the link with the shaft, a catch member with which the latch member is engageable in a plurality of positions, and an actuator engageable with the latch member to move the latch member to a desired position relative to the catch member, wherein movement of the latch member results in rotation of the shaft through the link to engage the cam member with the wall.

2. The improvement of claim 1, wherein the catch member is biased into engagement with the latch member, and wherein the latch member and the catch member are configured so as to move the latch member to different ones of the plurality of positions upon engagement by the actuator against the bias of the catch member into engagement with the latch member.

3. A food product mold, comprising
   a pair of side members;
   a movable wall moveable relative to the side members, wherein the movable wall is movable between a first position in which the movable wall cooperates with the pair of side members to define a cavity having a first volume and a second position in which the movable wall cooperates with the pair of side members to define a cavity having a second volume less than the first volume; and
   an operating mechanism for moving, the movable wall between its first and second positions, wherein the operating mechanism includes a retainer arrangement for moving the movable wall to a plurality of intermediate positions between its first and second positions, wherein the operating mechanism includes at least one cam member engageable with the movable wall for moving the movable wall, and a retainer arrangement interconnected with the cam member for controlling the position of the cam member relative to the movable wall for selectively placing the movable wall in its first position, second position, and intermediate positions, wherein the operating mechanism further includes a rotatable shaft to which the cam member is mounted and a link member secured to the shaft, and wherein the retainer arrangement includes a latch member to which the link member is pivotably mounted and a catch member for engaging the latch member and retaining the latch member in one of a plurality of positions, wherein movement of the latch member is operable to vary the position of the cam member to move the movable wall, wherein the latch member includes a tooth and wherein the catch member includes a series of recesses with which the tooth is engageable for selectively retaining the latch member in one of a plurality of positions to retain the cam member in a desired position relative to the movable wall.

4. The food product mold of claim 3, further comprising a spring interconnected with the catch member for maintaining the catch member in engagement with the latch member tooth.

5. The food product mold of claim 4, wherein the latch member tooth and the catch member recesses are configured so as to enable movement of the latch member in one direction relative to the catch member against the force of the spring.

6. A food product mold, comprising:

a pair of side members;

a movable wall moveable relative to the side members, wherein the movable wall is movable between a first position in which the movable wall cooperates with the pair of side members to define a cavity having a first volume and a second position in which the movable wall cooperates with the pair of side members to define a cavity having a second volume less than the first volume; and an operating mechanism for moving the movable wall between its first and second positions wherein the operating mechanism includes a retainer arrangement for moving the movable wall to a plurality of intermediate positions between its first and second positions, wherein the operating mechanism includes at least one cam member engageable with the movable wall for moving the movable wall, and a retainer arrangement interconnected with the cam member for controlling the position of the cam member relative to the movable wall for selectively placing the movable wall in its first position, second position and intermediate positions, wherein the operating mechanism further includes a rotatable shaft to which the cam member is mounted and a link member secured to the shaft, and wherein the retainer arrangement includes a latch member to which the link member is pivotably mounted and a catch member for engaging the latch member and retaining the latch member in one of a plurality of positions, wherein movement of the latch member is operable to vary the position of the cam member to move the movable wall, and further comprising an actuator for selectively moving the latch member relative to the catch member.

7. In a food processing system having a loading station for receiving a food product into a food product mold for processing and an unloading station for removing a processed food product from the food product mold, the improvement comprising:

a movable wall associated with the mold and defining at least in part a cavity in which the food product is received;

an operating mechanism interconnected with the movable wall for moving the movable wall between a first position in which the movable wall defines a cavity having a first volume and a second position in which the movable wall defines a cavity having a second volume less than the first volume;

a loading actuator located at the loading station for moving the movable wall to its second position after the food product is loaded into the cavity; and an unloading actuator located toward the discharge for moving the movable wall away from its second position to facilitate unloading of the food product from the cavity, wherein the wall extends between a pair of spaced side members and is movable relative thereto between its first and second positions, and wherein the operating mechanism is interconnected with the pair of spaced side members, wherein the operating mechanism includes at least one shaft rotatable mounted to the pair of spaced side members and extending therebetween; a cam member mounted to the shaft and engageable with the wall; and a shaft rotating mechanism for selectively imparting rotation to the shaft to selectively engage the cam member with the wall for moving the wall from its first position and its second position, wherein the shaft rotating mechanism comprises a link fixed to the shaft, a latch member to which the link is pivotally mounted at a location spaced from the interconnection of the link with the shaft, a catch member with which the latch member is engageable in a plurality of positions, wherein the loading actuator is engageable with the latch member to move the latch member to a desired position relative to the catch member, wherein movement of the latch member results in rotation of the shaft through the link to engage the cam member with the wall, wherein the loading actuator is engageable with the latch member and the catch member to release the latch member from the catch member, wherein movement of the latch member results in rotation of the shaft through the link to disengage the cam member from the wall.

8. The improvement of claim 7 wherein the catch member is biased into engagement with the latch member, and wherein the latch member and catch member are configured so as to move the latch member to different ones of the plurality of positions upon engagement by the loading actuator against the bias of the catch member and to engagement with the latch member.

9. The improvement of claim 7, wherein the catch member is biased into engagement with the latch member, and wherein the latch member and the catch member are configured so as to move the latch member to different ones of the plurality of positions upon engagement by the unloading actuator against the bias of the catch member and to engagement with the latch member.

10. An adjustable mold for a food processing system comprising:

a mold cavity defined at least in part by a movable end wall;

at least one shaft rotatably mounted to the mold adjacent the mold cavity;

at least one cam fixedly attached to the shaft and located adjacent the end wall;

a link having a first end and a second end, the first end being fixedly attached to the shaft;

a latch pivotally attached to the second end of the link;

a spring biased ratchet locking mechanism having a series of spaced teeth;

an engaging actuator for rotating the shaft to engage the cam against the wall and thereby adjust the position of the end wall within the mold cavity;

a releasing actuator for disengaging the cam from the end wall;

wherein the latch has a pawl for engaging the teeth of the ratchet locking mechanism when the cam is engaged against the wall;

wherein the engaging actuator is operable on the latch to engage the cam against the end wall via rotation of the shaft to the wall within the mold cavity; and wherein the releasing actuator is operable on the latch to disengage the latch pawl from the ratchet loading mechanism to release engagement of the cam with the wall.

* * * * *